W. PRELLWITZ.
DUST COLLECTOR FOR DRILLS.
APPLICATION FILED OCT. 26, 1907.
1,023,594.
Patented Apr. 16, 1912.
3 SHEETS—SHEET 1.
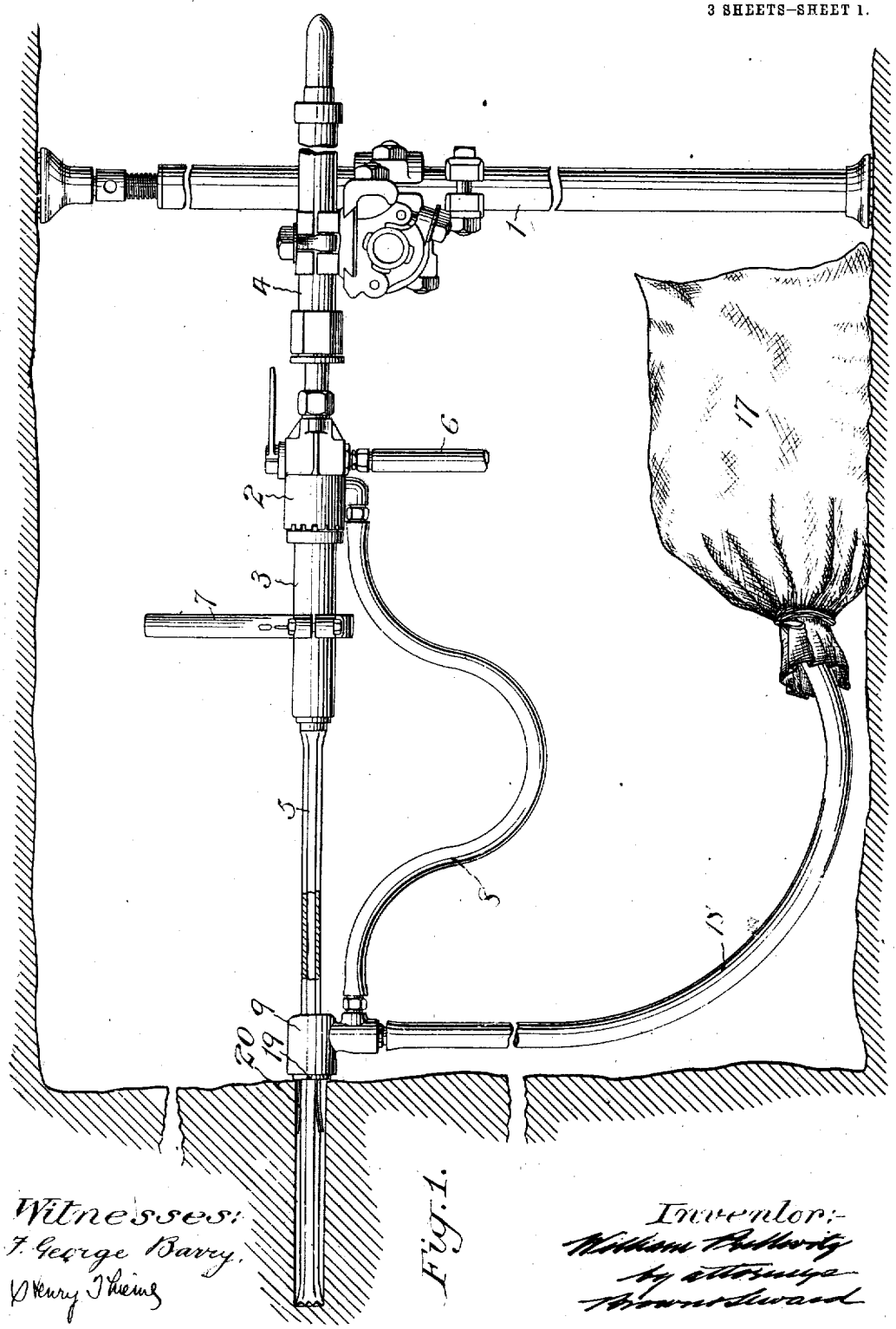

W. FRELLWITZ.
DUST COLLECTOR FOR DRILLS.
APPLICATION FILED OCT. 26, 1907.
1,023,594.
Patented Apr. 16, 1912.
3 SHEETS—SHEET 2.
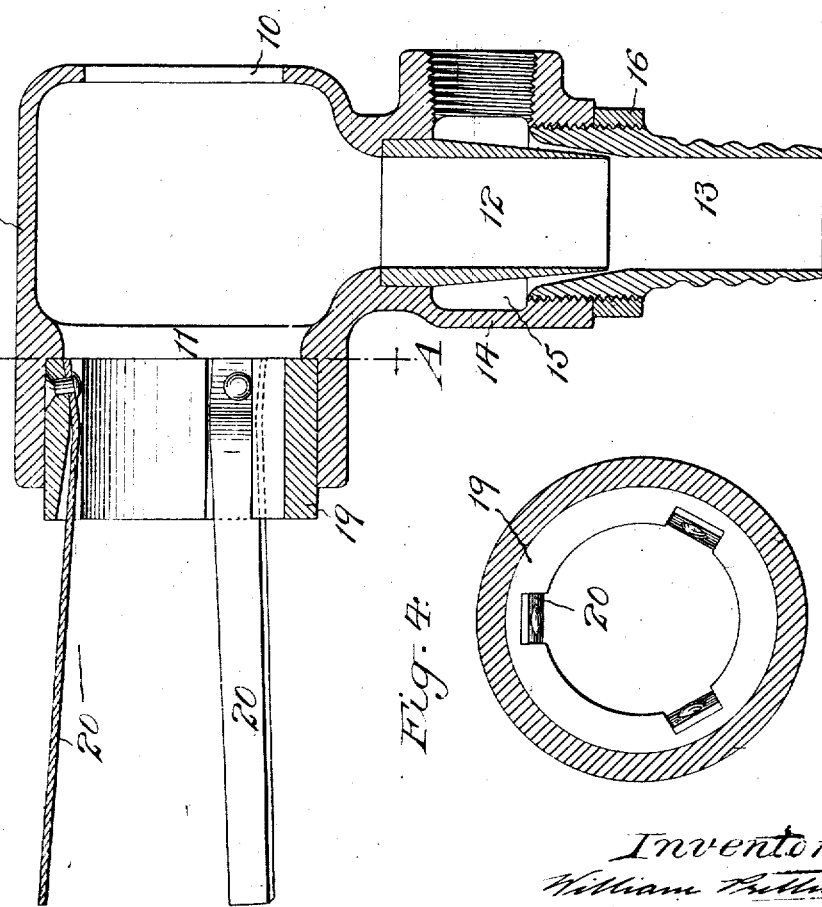

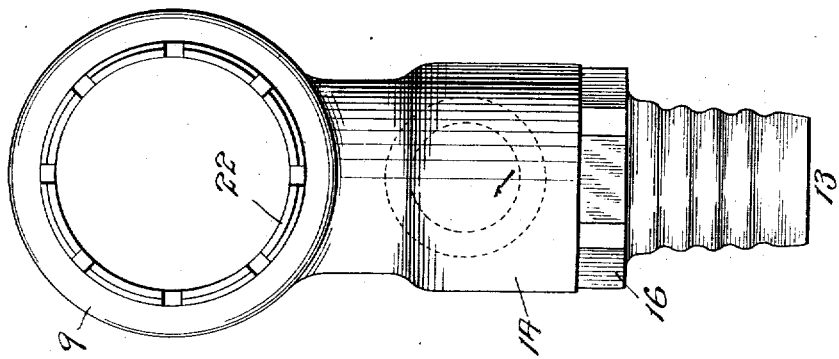
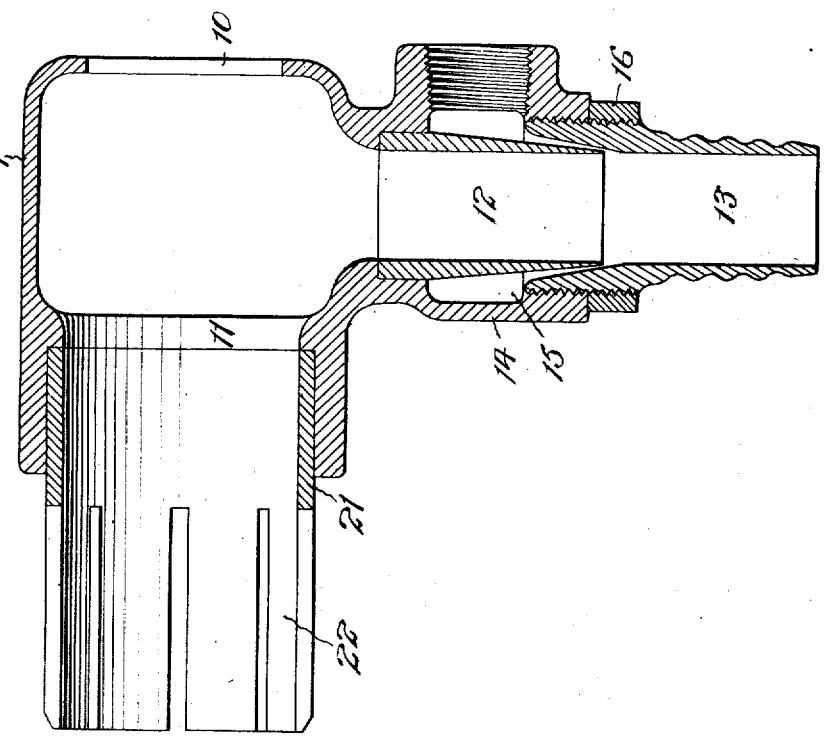

UNITED STATES PATENT OFFICE.

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

DUST-COLLECTOR FOR DRILLS.

1,023,594.  Specification of Letters Patent.  Patented Apr. 16, 1912.

Application filed October 28, 1907. Serial No. 399,249.

*To all whom it may concern:*

Be it known that I, WILLIAM PRELLWITZ, a citizen of the United States, and resident of Easton, in the county of Northampton and State of Pennsylvania, have invented a new and useful Improvement in Dust-Collectors for Drills, of which the following is a specification.

In connection with rock drills, more particularly those known as hammer drills and preferably those which use a hollow drill steel, where air blows through the steel for ejecting the cuttings, a great deal of dust is caused by the latter blowing out of the drill hole. The dust and chips blown from the hole make it unhealthy and annoying to the operator of the drill as the operator must necessarily inhale the dust to a greater or lesser extent.

The object of this present invention is to obviate these objections by providing a dust collector which may be secured to the hole being bored, said dust collector having an ejector operated either by live air or the exhaust from the drill for forcing the dust and chips into a receptacle provided therefor or to any predetermined point.

A practical embodiment of my invention is represented in the accompanying drawings in which—

Figure 1 is a view showing the dust collector in position for use in connection with an air power feed hammer drill supported from a vertical column, one form of device for securing the collector to the hole being represented. Fig. 2 is an enlarged section through the hollow casing, the ejector and the friction holding device of the dust collector. Fig. 3 is an outside view of the same, Fig. 4 is a cross section taken in the plane of the line A—A of Fig. 2, looking in the direction of the arrows. Fig. 5 is an enlarged section through the modified form of casing, ejector and friction holding device, and Fig. 6 is an outside view of the same.

The drill in connection with which I have shown and will describe my dust collector is of the air feed hammer drill type and it is represented as being supported from a column bar 1. The head block of the drill is denoted by 2, its cylinder by 3, the rear extension by 4 and the hollow drill steel by 5. The motive fluid for the drill may be admitted through a pipe 6, which fluid in the present instance also serves to feed the drill to its work. A handle 7 is provided for oscillating the drill while in operation. In this form of drill a certain amount of the air is passed through the drill steel for dislodging the dust and chips from the hole being bored and the balance of the motive fluid is exhausted through the flexible tube 8.

The hollow casing of the dust collector is denoted by 9 and it is provided with openings 10 and 11 through which the drill steel 5 may be passed and fed to its work. The inner nozzle of an ejector forming part of the casing 9, is denoted by 12 and the outer nozzle of the ejector denoted by 13 is provided with a screw-threaded engagement with an extension 14 of the casing, in which extension is located a chamber 15 in open communication with the flexible pipe 8, which pipe is of sufficient length to permit the insertion and withdrawal of the longest drill steel which it is intended to use in connection with the drill. It is to be understood that the outer nozzle 13 of the ejector may be adjusted so as to control the opening between the inner and outer nozzles to suit different requirements; as for instance, if it be desired to feed live air directly to the ejector instead of the exhaust from the drill.

A lock nut 16 is provided for locking the outer nozzle 13 of the ejector in its adjustment. A receptacle is provided for the dust and chips, which receptacle is herein shown as a porous bag 17 which is preferably woven sufficiently close to maintain a few pounds of air pressure therein but which will let the air leak through the meshes thereof gradually and at the same time keep the dust and chips therein. A flexible tube 18 leads from the ejector nozzle 13 into the bag 17 for permitting the ejector to force the dust and chips into the said receptacle.

The device which I have shown in Figs. 1 to 4 inclusive for frictionally securing the casing 9 of the dust collector to the hole being bored, comprises a sleeve 19 secured within the opening 11 of the casing, which sleeve is provided with a plurality of spring-actuated fingers 20, the inner ends of which are secured to the said sleeve and the outer ends of which are intended to be inserted into the hole being bored, for frictionally engaging the walls of the said hole. The shape of these fingers is such that the drill steel may be inserted into and removed from the hole without the necessity of removing the casing of the dust collector from its position. In this form the casing may be secured to the hole being bored, without enlarging the mouth of the hole.

In the form shown in Figs. 5 and 6, the sleeve 21 is secured in the opening 11 of the casing 9, and the portion of the sleeve which projects from the casing is divided into a plurality of fingers 22 which are arranged to frictionally engage the walls of an enlarged portion of the hole being bored. When this latter form of friction device is used, the hole is started by a larger bit for a sufficient distance to permit the insertion of the fingers 22 and then a smaller bit is used for continuing the boring of the hole. This form also will permit the free insertion and removal of the drill steel without necessitating the removal of the casing of the collector.

In operation the hole is first drilled to a depth of several inches. If the casing of the collector has been slipped over the drill steel previous to the starting of the drill, the friction holding fingers of its attaching device can then be inserted into the holes for securing the casing in position. Otherwise the drill steel may be withdrawn and the casing then secured in position and the drill steel again inserted into position for work. As the drilling is continued and the dust and chips fly out of the hole being bored, the ejector sucks the dust and chips from the hole and forces the same into the receptacle provided therefor.

While I have shown this dust collector as being applied to an air feed hammer drill, it is to be understood that it may be used in connection with drills of any other kind. It is also to be understood that either live air or exhaust air may be used for operating the ejector. The receptacle for the dust and chips may be eliminated and the flexible tube 18 be extended to any desired point where it is desired to deposit the dust and chips.

It is evident that various changes may be resorted to in the construction, form and arrangement of the several parts without departing from the spirit and scope of my invention; hence I do not wish to limit myself strictly to the structure herein set forth, but

What I claim is:

1. The combination with a drill having a hollow steel through which air is forced for ejecting the cuttings from the hole being bored, of a dust collector comprising a hollow casing located at the mouth of the hole being bored and an ejector controlled by the motive fluid of the drill for forcing the cuttings from the hollow casing to a predetermined point.

2. The combination with a drill having a hollow steel through which air is forced for ejecting the cuttings from the hole being bored, of a dust collector comprising a hollow casing located at the mouth of the hole being bored and an ejector controlled by the motive fluid exhaust from the drill for forcing the cuttings from the hollow casing to a predetermined point.

3. The combination with a drill, of a dust collector comprising a hollow casing located at the mouth of the hole being bored, a receptacle, a tube leading from the hollow casing to the receptacle and an ejector located between the hollow casing and receptacle and controlled by the motive fluid of the drill for forcing the cuttings from the hollow casing through the tube into said receptacle.

4. The combination with a drill, of a dust collector, comprising a hollow casing located at the mouth of the hole being bored, a receptacle, a tube leading from the hollow casing to the receptacle and an ejector located between the hollow casing and receptacle and controlled by the motive fluid exhaust from the drill for forcing the cuttings from the hollow casing through the tube into said receptacle.

5. The combination with a drill, of a dust collector comprising a hollow casing, a device for securing the casing to the hole being bored, a receptacle, a tube leading from the hollow casing to the receptacle and an ejector controlled by the motive fluid of the drill for forcing the cuttings from the hollow casing through the tube into said receptacle.

6. The combination with a drill, of a dust collector comprising a hollow casing, a device for securing the casing to the hole being bored, a receptacle, a tube leading from the hollow casing to the receptacle and an ejector controlled by the motive fluid exhaust from the drill for forcing the cuttings from the hollow casing through the tube into said receptacle.

7. The combination with a drill, of a dust collector including a hollow casing located at the mouth of the hole being bored and an ejector controlled by the motive fluid of the drill for forcing the cuttings from said casing to a predetermined point.

8. The combination with a drill, of a dust collector including a hollow casing located at the mouth of the hole being bored and an ejector controlled by the motive fluid exhaust from the drill for forcing the cuttings from the hollow casing to a predetermined point.

In testimony, that I claim the foregoing as my invention, I have signed my name in presence of two witnesses, this 21st day of October 1907.

WILLIAM PRELLWITZ.

Witnesses:
F. GEORGE BARRY,
HENRY THIEME.